Patented Feb. 24, 1942

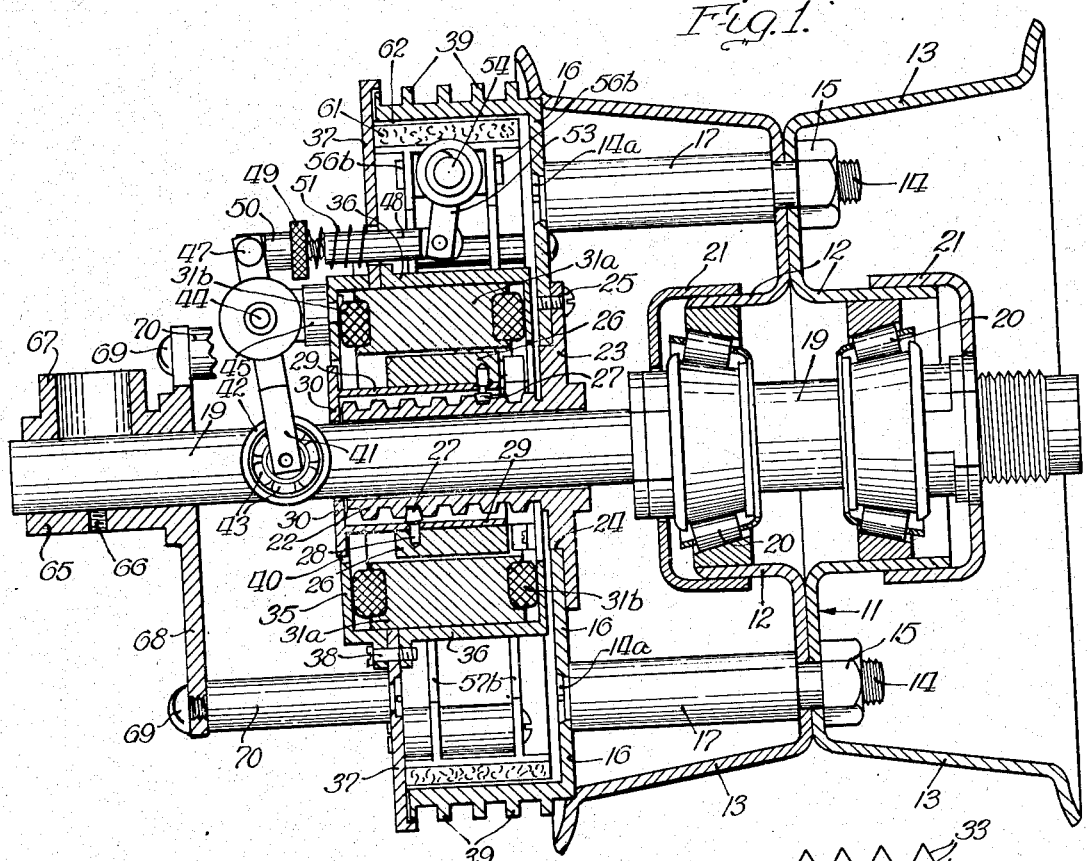

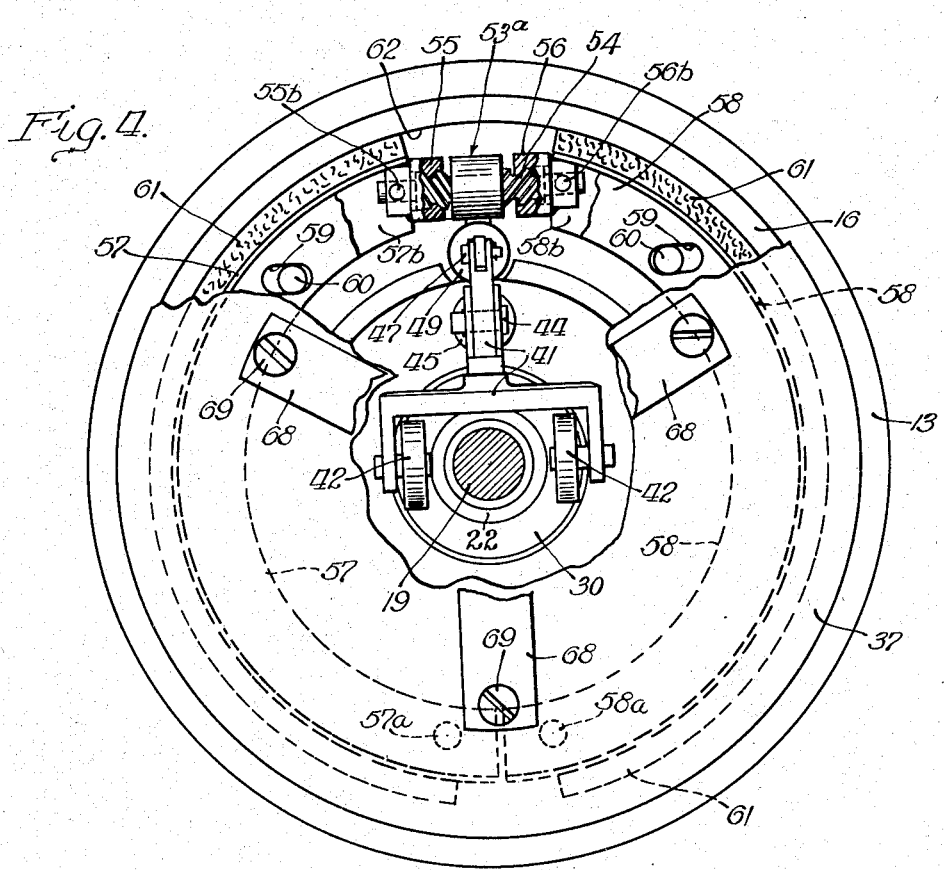
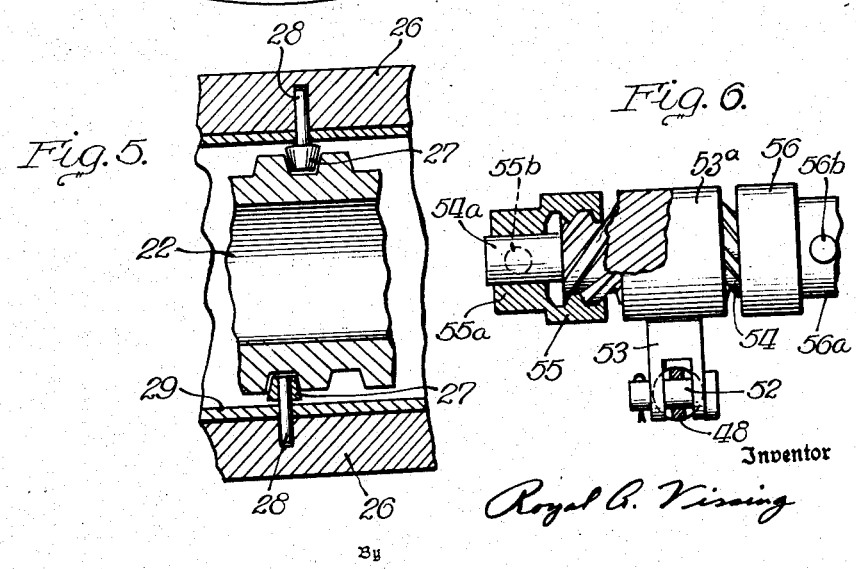

2,274,109

UNITED STATES PATENT OFFICE 2,274,109

ELECTRICAL BRAKE CONTROL MECHANISM

Royal A. Vissing, Yerington, Nev., assignor of one-third to Harry H. Roe, Salt Lake City, Utah, and one-third to Philip E. Siggers, Washington, D. C.

Application February 9, 1940, Serial No. 318,018

28 Claims. (Cl. 188—138)

This invention relates to electro-magnetically controlled operating mechanisms which may be used to actuate a wide variety of other mechanisms, such as brakes. Among other objects, the invention aims to provide an improved operating mechanism for brakes (whether hydraulic, pneumatic or mechanical) which is extremely sensitive, which is capable of exerting an enormous braking effort or as little as desired, which is compact, easily assembled, disassembled and manufactured, and which is especially well adapted for use in the automotive and aeronautical fields, without more than slight structural changes in the vehicles or airplanes. The invention has other objects which will be apparent from the following description of one embodiment, shown in the accompanying drawings forming a part of this specification.

In said drawings:

Fig. 1 is a sectional elevation of a wheel and brake and the operating mechanism of the invention;

Fig. 2 is a detail, in elevation and on the same scale, showing certain parts in different positions, as when the brake is fully applied;

Fig. 3 is an elevation, partly in section, of the field of the electro-magnetic portion of the operating mechanism, showing diagrammatically a source of electricity and an adjustable rheostat for controlling the flow of electricity through the field;

Fig. 4 is an elevation of the brake drum and brake, with parts broken away, showing also the lever for transmitting pressure from the electromagnetic parts to the brake;

Fig. 5 is enlarged detail in section; and

Fig. 6 is still another detail, in sectional elevation, on a larger scale than Fig. 1.

Referring particularly to the drawings, a wheel 11 is shown having a hub 12 and flanged rim 13 for receiving a rubber tire not shown. The wheel 11 is of the split type, comprising two similar steel halves or disks joined together by bolts 14 and nuts 15. Bolts 14, of which there may be two or more, have their heads 14a engaging a brake drum 16, to be described, and spacing sleeves 17 surround the shanks of the bolts 14, extending between the brake drum 16 and the wheel disk. Thus when nuts 15 are tightened, the brake drum is secured to the wheel. In the illustrative embodiment, the brake drum is wholly outside of the wheel, that is, is not enclosed within the wheel rim. Thus the brake drum rotates with the wheel, and slows down the wheel when the brake, to be described, is applied.

The wheel is rotatably mounted on a stationary axle 19 which passes through the center of the brake drum and of the wheel. Roller or other bearings 20 are located between the hub of the wheel and the axle, and hub caps 21 seal the bearings. The showing of the roller bearings and hub caps is somewhat diagrammatic, as these elements form no part of the present invention.

Surrounding the axle 19 loosely is a hollow worm or screw 22 (which may have single or multiple threads), said worm or screw being secured to and preferably integral with a disk 23 which fits into an aperture 24 in one face of the brake drum 16. Screws 25 secure disk 23, and hence worm or screw 22, to the brake drum, so that said worm or screw rotates with the wheel, and at the same angular speed. The helix angle of the thread or threads of the worm or screw 22 is such as to assure rapid action on a member threaded on or engaged with the threads of the worm or screw.

In the illustrative embodiment, an annular armature 26 surrounds the worm or screw 22 and is moved thereby because of the engagement of one or more conical rollers 27 on the outer ends of pins 28 (Figs. 1 and 5) secured to the armature on the inside and extending radially inwardly toward the axis of the screw 22. There will be at least as many rollers 27 as there are threads: thus a triple thread will be engaged by at least three rollers, and a single thread may be engaged by as many rollers as are necessary to transmit the stresses. Roller and thread engagement is preferable to thread and thread engagement (as in a nut) because the friction is so much less. The armature 26 is preferably composed of laminations of soft iron (not shown), so as to be very responsive to a magnetic field, and has the usual conducting bars 26a (Fig. 3) of the rotor of a squirrel cage motor. Secured to the armature on the inside is a non-magnetic spool 29 having an annular flange 30 at one end, said flange 30 having a close clearance around axle 19 and movable lengthwise of the axle when there is relative angular movement between the armature and the worm or screw 22. In other words, the instant the armature is retarded, while rotating, spool 29 will move outwardly, or from the position of Fig. 1 to that of Fig. 2. The flange 30 constitutes a reciprocable head exerting a thrust parallel to the wheel axle on any mechanism interposed in its path, and thus may be used to actuate a brake or other mechanism.

To retard the armature, I prefer to employ a stationary field, surrounding the armature but normally not magnetized. The field may have many different constructions, but in the illustrative embodiment I have shown a field comprising six poles 31 (Fig. 3), each of which consists of a pole piece 31a and a winding 31b, the pole pieces 31a being magnetically connected. The windings are shown connected in series and are adapted to be energized from a source of electricity 32 such as a storage battery, a rheostat 33 serving as a switch and control mechanism to vary the magnetic field and hence control the retarding force on the armature. By employing a suitable rheostat, the degree of control may be very fine, and the retardation of the armature due to the magnetic field may be varied from an amount barely sufficient to cause the brake bands (to be described) to touch the brake drum, to an amount which will be just short of brake locking. The field, which in general construction preferably is a standard motor field, is shown enclosed by a housing composed of two members 35, 36 united to each other on opposite sides of an annular plate or disk 37 by screws 38. Plate 37 closes one side of the brake drum 16 and hence has a sufficiently close fit therewith to keep dust out, without creating friction. The periphery of the brake drum 16 preferably has a plurality of annular ribs 39 to dissipate the heat generated by braking. The housing member 35 necessarily has a central opening 40 through which the head 30 moves as the armature is retarded. Head 30, of course, rotates with the armature.

To translate outward movement of head 30 into braking effort, many different mechanisms may be employed, as will be understood by those skilled in the art of brakes. In the illustrative example, a generally Y-shaped lever 41 is employed, said lever carrying a pair of rollers 42 at its bifurcated end, the rollers being rotatable on ball bearings 43. The two rollers are adapted to bear at diametrically opposite points on the annular head 30, and lever 41 straddles the axle 19 to permit this. The pivot 44 of lever 41 is intermediate its ends, said pivot being on a fulcrum member 45 secured to the housing member 35 as by a screw 46. The position of pivot 44 is adjustable. At its resistance end, the lever 41 is pivotally connected as at 47 with a rod 48 which may be threaded to one end to receive a nut 49 having a knurled head, as shown, to permit adjusting the effective length of rod 48, thereby to compensate for wear of the brake shoes to be described. The head of the nut 49 is shown connected by a clevis 50 to pivot 47, which is a clevis pin. A coil spring 51 may be carried on rod 48 to bear against the head of the nut 49 and the plate 37, thereby to tend to swing the lever 41 into engagement (through rollers 42) with the movable head 30. Inward adjustment of the nut 49 obviously will tighten the tension of said coil spring, thus causing the lever to bear more firmly against head 30. Spring 51 tends to move head 30 and hence the armature 26 back to the positions shown in Fig. 1; thus the spring 51 is primarily a resetting device, which will act automatically whenever the magnetic field is de-energized. It will be appreciated that if this automatic resetting feature is employed with the described mechanism, it is absolutely necessary that the helix angle of worm 22 be such that the backward thrust of lever 41 shall be effective to move the armature back to the position of Fig. 1, immediately after each application of the brake.

Rod 48 is pivotally connected by a clevis pin 52 with a clevis 53 fast to the unthreaded central hub 53a of a screw 54 (Figs. 4 and 6) having right and left hand threads on either side of the hub and carrying nuts 55, 56. The arrangement is such that said nuts simultaneously move away from the hub when the rod 48 is moved into the interior of the brake drum, that is, movement of lever 41 from the position of Fig. 1 to that of Fig. 2 will cause separation of nuts 55, 56. As shown in Fig. 6, the pivotal connection between clevis 53 and rod 48 is loose, to permit the screw 54 (to which the clevis is rigidly secured) to move in either direction along its axis, in the event the brakes are not perfectly equalized. In other words, the screw 54 may move longitudinally in either direction responsive to the reactions of the brake shoes when the brake is applied. Such longitudinal movement is entirely independent of the turning of the screw on its axis, and is highly desirable because one brake shoe may be in a different position from the other at the moment the brake is applied.

Said nuts 55, 56 operate on the ends of brake shoes 57, 58 mounted on pivots 57a, 58a respectively within the brake drum 16. Said brake shoes may have the usual short slots 59 through which fixed pins 60 project to guide the shoes as they are moved. Brake linings 61 of conventional construction are riveted on the outer surfaces of the brake shoes and are adapted to bear frictionally against the inside surface 62 of the brake drum. As the screw 54 is turned in one direction, nuts 55, 56 are moved apart with equal pressure. Each nut 55, 56 has a head 55a, 56a which is pivoted by a pair of alined pins 55b, 56b to the flanges 57b, 58b of the brake shoes 57, 58 respectively. The extremities of screw 54 are reduced and are circular in cross section, as indicated at 54a, so that the heads 55a, 56a of the nuts 55, 56 slidably receive said extremities 54a. Preferably the screw 54 has a multiple thread of a high helix angle for strength and quick action.

The wheel and brake assembly may be supported from one or both ends of the axle, as will be understood without illustration. In the example shown, one end of the axle passes through a bearing block 65, a set screw 66 securing the axle against rotation. The bearing block may have an integral sleeve or hub 67 to facilitate connecting a rod or a shock absorber to the wheel and brake assembly. Secured to and preferably integral with the bearing block is a spider 68 comprising three arms the extremities of which are connected with plate 37 by screw bolts 69 having spacer sleeves 70. Thus the field 31, its housing, the brake itself and the brake-operating linkage are all held together and are non-rotatable. Instead of a spider, a housing (not shown) may enclose the lever 41 and its bearings.

When the traveling armature 26 is at the position of Fig. 1, it is rotating with the wheel and at the same angular speed. To prevent the armature from moving out against the lever when there is no current magnetizing the field, a pair of permanent magnets are provided, each preferably being semi-circular, one of the permanent magnets 71 being mounted on disk 23 and the other magnet 72 being secured to the armature 26. The ends 73 of magnet 71 (which constitute pole-pieces) are on diametrically opposite sides of screw 22 and lie in the same plane, and the ends 74 of magnet 72 are also bent outwardly to provide pole-pieces which engage the other pole-pieces when the armature is at one end of screw 22. Thus the armature is held out of engagement with the lever bearings (the position of Fig. 1) as long as there is no magnetic field effecting retardation of the rotating armature. This is important to avoid constant wear in the lever bearings when the wheel is rotating without application of the brake. Instead of magnets, mechanical locking means may be used.

Operation and use

If the wheel shown is assumed to be an airplane wheel, as soon as its tire touches the ground, the wheel starts to spin on the axle, and controlled braking effort may then be applied to slow down the airplane. As the wheel spins, brake drum 16 and the worm or screw 22 rotate with it, and the armature 26 (with the non-magnetic spool 29) likewise rotates, remaining in the position of Fig. 1 until a magnetic field displaces the armature by retardation. On the other hand, plate 37, lever 41 and the parts operated thereby, including the brake shoes, also the spider 68 and bearing block 65, and all parts secured to these members, remain stationary (or to be more accurate, these parts do not rotate). As soon as the operator through rheostat switch 33 connects the field 31 with the source of electricity 32, magnetic lines of force intersect the rotating armature, which sets up counter lines of force, creating a magnetic drag or retardation force which is very powerful and is instantaneous in action. This magnetic drag or retardation forces the armature, and the non-magnetic spool 29, to the left as viewed in Fig. 1, because of the action of the thread or threads of rotating screw 22 on the rollers 27 carried by the armature-spool assembly. The threads of screw 22 are, of course, essentially a series of inclined planes, which afford a high mechanical advantage; in other words, the outward thrust of the head 30 of the armature-spool assembly is many times the force of retardation on the armature. As head 30 moves outwardly it encounters the rollers 42 of lever 41, and swings said lever clockwise as viewed in Fig. 1, the extreme position of said lever being shown in Fig. 2. Due to the position of the lever pivot 44, the lever affords additional mechanical advantage, which is further increased by the clevis arm 53 (which is a lever arm). Finally, the right and left threads on screw 54 afford still further mechanical advantage. The net result of all these linked mechanical advantages is enormously to multiply the energy available from retardation of the rotating armature; and as this energy may be considerable in itself (a fraction of a horsepower up to several horsepower) there is an almost unlimited amount of energy available at the point where it is needed. And this practically unlimited energy may be controlled with the utmost sensitiveness and accuracy by merely adjusting the rheostat. By the invention, the rotating wheel, with the aid of mechanical advantages, supplies practically all of the energy necessary to brake itself.

The described outward movement of head 30 is opposed by spring 51, which is compressed against plate 37 (Fig. 1). When the wheel stops rotating, and the magnetic field is broken by the operator, there will be no force opposing the compressed spring 51, which accordingly, through lever 41, will thrust the head 30 back to its initial position, thus resetting the mechanism. This resetting is of course essential for dependability: the brake must always be ready for instant service. The spring acts automatically and practically instantaneously to reset or restore the mechanism to the position permitting braking and will so act even if the wheel never stops rotating, provided the magnetic field is broken.

When an airplane's wheels first touch the ground, said wheels are suddenly transformed from a state of rest to a very high angular velocity: all but the slowest airplanes usually landing at 60–80 M. P. H. As a heavy tire is carried on such wheels, a high momentum is generated, and the momentum of the plane itself is added to that of the wheels to tend to continue rotation of the latter for a considerable period. It is important that braking of the wheels shall start as soon as the wheels are firmly on the ground, because even a few seconds' delay makes an enormous difference at high speeds, but it is of special importance that the braking shall not lock the wheels, because locked wheels may result in a serious accident. The invention provides a braking system which will make locking of the wheels highly improbable because with less velocity of the wheel, a far greater magnetic drag must be imposed on the armature to cause such an increase in the braking thrust of the armature-spool assembly as would lock the wheel. As the wheel stops, if the field 31 is de-energized, there is no force available to oppose the back thrust of the resetting spring 51, and the spring promptly restores the lever 41 to the position shown in Fig. 1, the armature-spool assembly being rotated about the stationary worm 22. To set the brakes when the airplane is at a standstill and it is desired to hold it still momentarily, as when "gunning" the engines immediately prior to a takeoff, the operator will allow the plane to move a few feet which, with energization of the field, will provide the necessary energy for applying the brakes.

Ordinarily, two wheels of an airplane are braked simultaneously, though in some instances three or more wheels must be braked. It is usually essential, for safe deceleration of the airplane, that the braking force exerted on one wheel shall exactly equal that exerted on each of the other wheels. The invention makes this possible, and in fact, certain, since any number of wheels (each equipped with the braking system of the present invention) may be braked simultaneously with equal deceleration because the magnetic retardation must be exactly the same on each armature, if all the fields are electrically connected to the same rheostatic switch 33.

From what has been said, it will be clear that the present invention is well adapted for automotive work, especially if four, six or eight wheels must be braked simultaneously with equal force but without locking. For large freight trailers, the invention is epsecially useful, because control is had through a couple of wires or other conductors which may be sheathed in flexible cables and may extend from the rheostat in the cab of the motive unit to the wheels thereof and also to all the wheels of the trailer. Swinging of the trailer behind the motive unit is of no consequence when (as in an installation employing the invention) there are no mechanical parts bridging the zone of movement.

However, the invention doubtless will find its greatest field of usefulness in aircraft, particularly because of the desirability of retractile landing gear and the mechanical complications that result from an attempt to control brakes (whether mechanical or hydraulic) on such gear. According to the invention, the only connection required between the source of electricity (and its control element, the rheostat) and the brake is a conducting path for the electrical current which magnetically excites the armature as and for the purpose described. Such a conducting path need not even be a pair of conventional wires but may be in part the retractile landing gear itself. Thus a material saving in weight may be realized by use of the invention on aircraft, since present heavy brake controls will be eliminated.

When a wheel equipped with the braking system of the invention is rotating, it has a considerable momentum, like a flywheel, and as it rotates a magnetizable member (the armature) at its own angular velocity, said magnetizable member will generate a powerful E. M. F. counter to the magnetic field of the stationary field member. In other words, the momentum of the wheel is utilized as a source of energy to generate a magnetic field which actuates an element which operates the wheel braking mechanism. The counter E. M. F. of the armature depends on two variables, namely, the speed of rotation of the armature and the amount of flux or magnetic stress surrounding and passing through the armature, and the latter depends on the strength of current flowing from the source of electrical energy 32. Thus the braking effect may be exceedingly powerful or very little, as desired. Furthermore, because of the use of a rheostat, the range of control of the braking action may be much greater than is possible with brakes of known types.

While the wheel shown is braked only in one direction, which is all that is necessary in aircraft, in automotive work it may be desirable to permit braking the wheel when backing the vehicle. Such an arrangement is not shown in the drawing.

The invention has other uses, applications and advantages as will be appreciated by those skilled in the art. For instance, the invention need not be a brake actuator.

Obviously the present invention may be embodied in many forms neither described nor shown. Moreover, it is not indispensable, that all the features of the invention be used conjointly, since they may be employed advantageously in various combinations and sub-combinations.

Having described the invention, what I claim as new and desire to secure by Letters Patent is:

1. In combination with a wheel, and a brake for the wheel, operator-controlled actuating means for the brake comprising a screw rotated by the wheel, said screw having an external thread; an armature surrounding the screw and rotating therewith and mechanically connected with its thread; a stationary, magnetizable field surrounding the armature; a source of electricity; operator-controlled means for magnetizing the field from the source of electricity thereby magnetically retarding the armature and causing it to move along the screw; and a mechanism operated by the armature when moved along the screw to apply the brake.

2. The invention according to claim 1, wherein the armature-operated mechanism has a spring which is compressed when the brake is applied, the spring automatically restoring the armature to its initial position thus resetting the brake-actuating means.

3. The invention according to claim 1, wherein a permanent magnet is secured to the wheel and normally holds the armature at one limit of movement of the armature, but yields to the superior force of the magnetized field to permit the armature to move toward its other limit of movement.

4. The invention according to claim 1 wherein the screw is of small diameter compared to the diameter of the wheel and is directly connected at one end to the central part of the wheel; said screw surrounding the wheel axle but being free of contact therewith, being wholly supported by the wheel.

5. The invention according to claim 1, wherein the armature-operated mechanism comprises a lever pivoted intermediate its ends; a rod pivotally connected to one end of the lever; the other end of the lever being in the path of movement of the armature; an arm pivotally connected to the rod; a screw having right and left threads; the arm being secured to the screw to oscillate the same; and brake-actuating nuts respectively on the right and left threads and connected respectively to the ends of the brake shoes.

6. The invention according to claim 1, wherein there is a non-magnetic spool surrounding the screw and mechanically connected to the armature on the inside thereof; said spool having an integral annular head at one end which is outside the confines of the armature; said head adapted to be thrust against the brake-operating mechanism.

7. In combination with a wheel and a brake therefor, operator-controlled actuating means for the brake comprising a source of electricity, a rheostat connected to the source of electricity, and a stationary field adapted to be magnetically excited by the source of electricity; an armature surrounded by the field and being connected to the wheel so as to be rotated thereby; means to support the armature so as to permit movement thereof parallel to the axis of rotation; said field when excited effecting such armature movement because of a magnetic drag or retardation; and means actuated by the armature, when so moved parallel to the axis of rotation, to apply said brake.

8. The combination according to claim 7, wherein the means to support the armature is a screw rotated synchronously with the wheel, so that the armature exerts a greatly increased effort upon said brake-applying means, due to the mechanical advantage of the screw; the helix angle of the thread of the screw being such as to insure rapid action on the armature.

9. The invention according to claim 7, wherein there are means provided to hold the armature at one limit of its path of movement parallel to the axis of rotation, said holding means yielding to the superior force of the aforesaid magnetic retardation; and automatically acting means acts on the armature, after the magnetic retardation ceases, to restore it to the aforesaid limit of its movement; the first named means then acting automatically to securely hold the armature until again overcome by said magnetic retardation.

10. The combination with a wheel and a brake, a screw directly rotated by the wheel; a magnetizable member rotatable with and mounted on the screw and so connected with the screw threads that longitudinal movement in either direction is possible; an operator-controlled means for creating a magnetic field in which said magnetizable member rotates, thereby to create a drag on the rotating magnetizable member to cause it to travel on the screw; and brake-applying means interposed in the path of the magnetizable member as it moves longitudinally of the screw.

11. The invention according to claim 10, wherein the brake has brake shoes and the brake-applying means comprises a lever and a spring; the lever being engaged by a head carried on the magnetizable member and being so connected with the brake shoes as to apply the brake when the lever is swung in one direction; said spring restoring the lever and the head to their initial, inactive positions when the lever is released by the head.

12. A mechanical movement comprising, in combination, a mechanism for doing useful work having one member which is adapted to be actuated rectilinearly; a wheel; a magnetizable member; means for mechanically connecting the magnetizable member with the wheel so as to cause the magnetizable member to rotate with the wheel and also to be movable rectilinearly; said connecting means being independent of and spaced from the first-named member; a magnetic field surrounding the magnetizable member; operator controlled means to control the magnetic flux of the magnetic field; and means carried by the magnetizable member to move the first-named member rectilinearly to operate said mechanism.

13. In combination with a wheel having a brake drum and brake shoes; an operating lever; operator-controlled mechanism to swing the lever in one direction to apply said brake shoes; a spring which is compressed when the lever is swung to apply said brake shoes, said spring acting to restore the lever and the parts operated thereby to their inactive positions when the lever is released; a rod pivotally attached at one end to the resistance end of the lever; an arm pivotally connected at one end to the other end of said rod; a screw whose central portion is secured to the other end of said arm; said screw having left and right hand threads on opposite sides of said central portion; nuts having thread engagement respectively with said left and right hand threads; and means pivotally connecting each nut to the end of a brake shoe.

14. The invention according to claim 13, wherein the brake shoes are independently movable, and the pivotal connection between the rod and the arm permits the arm, and the screw to which the arm is secured, to move in either direction parallel to and along the longitudinal axis of the screw when the screw is oscillated by the rod; said pivotal connection thus permitting the screw to move axially responsive to the reactions from braking pressure on said brake shoes.

15. The invention according to claim 13, wherein the spring is a coil spring which surrounds said rod and abuts a fixed member at one end, the other end of the spring abutting an adjustable head on said rod; said adjustable head permitting variation in the effective length of the rod thereby compensating for wear of the brake shoes.

16. In combination with a wheel adapted to rotate on an axle, a brake drum secured to the wheel; braking means acting on the drum; a wheel-attached screw having an external thread surrounding but free of the axle; a non-magnetic spool surrounding and supported by but out of contact with the screw; an armature having means engaging the thread of the screw so that it may be moved longitudinally of the screw, said armature surrounding the spool and connected thereto so that the spool moves only with the armature; a stationary field surrounding the armature; a source of electricity; means for connecting the source of electricity with the field and for varying the magnetism of the field thereby to retard the armature; and means interposed between said spool and said braking means to brake the brake drum when the retarded armature causes the spool to travel.

17. In combination with a wheel, a member secured to the wheel and having an inclined plane co-axial with the wheel; an axle supporting the wheel; a brake carried by the wheel; a stationary field supported indirectly on the axle; an armature inside of the field; means mechanically connecting the armature with the inclined plane; means to hold the armature normally at one end of the inclined plane, said armature then rotating with the wheel; operator-controlled means to magnetically retard the rotating armature and causing the armature to travel along said inclined plane; and means engaged by the armature, as it so travels, to operate the brake.

18. The invention according to claim 17, wherein the means engaged by the armature to operate the brake comprises a lever one end of which is bifurcated and carries a pair of rollers on opposite sides of the axle; said armature carrying a non-magnetic member providing a head which surrounds the axle and directly contacts said rollers, said head rotating with the armature and swinging the lever on its fulcrum when the armature travels as aforesaid.

19. A braking system for wheels comprising in combination, a conventional wheel brake; and brake-operating means having magnetizable means and an operator-controlled magnetic field; means to guide and support the magnetizable means so that it may move rectilinearly relative to the magnetic field; and means to cause the magnetizable means to rotate with the wheel except when moved rectilinearly by magnetic drag.

20. The invention according to claim 10 wherein the magnetizable member carries a permanent magnet and the wheel carries another permanent magnet, said magnets being arranged so that opposite poles may be in contact thereby normally to hold the magnetizable member at one limit of movement on said screw, said magnets releasing the magnetizable member under the superior force of said magnetic drag on the magnetizable member but automatically engaging each other to hold the magnetizable member when the latter is restored to its aforesaid normal position; and a spring acting on said magnetizable member to restore the same to said normal position.

21. In combination with a wheel having a brake drum and a pair of brake shoes; a nut pivotally connected to one end of each brake shoe; a screw having right and left hand threads on its opposite ends; an arm rigidly secured to the central portion of the screw; the nuts being engaged with said threads so as to be moved toward or away from each other simultaneously, thereby respectively to release or apply the brake shoes, when the arm is swung; a spring which is compressed when the brake shoes are applied; said screw being movable along its axis in either direction responsive to the reactions from braking pressure on said brake shoes; and operator-controlled brake-applying mechanism comprising a source of electricity, a rheostat, a field adapted to be variably excited from the source of electricity, an armature movable relative to the field, means connected with the wheel to effect both rotation and straight line movement of the armature, and means interposed between the armature and said arm so that the armature may effect swinging of said arm to apply the brake shoes when the armature is retarded by magnetic retardation and thus is moved in a straight line.

22. The invention according to claim 21 wherein the means interposed between the armature and said arm comprises a lever pivoted intermediate its ends and having one end bifurcated and straddling the wheel axle, anti-friction rollers on the bifurcated end, a non-magnetic spool inside the armature and having a head outside the confines of the armature, said head being adapted to engage the anti-friction rollers when the armature is moved by magnetic retardation thereby to swing said lever, and means connecting the lever on the opposite side of its pivot with said arm.

23. A mechanical movement comprising, in combination, a member having a helical inclined plane; means secured to said member to rotate the same on its axis; an armature mechanically connected to the inclined plane and adapted to rotate with and also to move longitudinally of said member; a stationary magnetizable field surrounding the armature; a source of electricity; means connecting the source of electricity with the field; operator-controlled means for varying the magnetic flux of the field thereby varying the lines of force cut by the armature when rotating; the armature thereby being magnetically retarded and thus moving longitudinally of said member; a lever which is entirely separate from said means which rotates said member on its axis; a mechanism actuated by the lever to do useful work; means on the armature to engage the lever to operate the same when the armature has been moved longitudinally; and a spring to restore the lever and armature to their initial positions.

24. In combination, a wheel; a brake for the wheel; a member rotated by the wheel about the wheel axis and having a helical inclined plane; means co-axial with said member and engaging said inclined plane so as to travel along the wheel axis; said means engaging and rotating synchronously with said member when not traveling along the wheel axis; operator-controlled means to retard said inclined plane-engaging means during rotation thereby to effect the aforesaid travel along the wheel axis; a lever connected to the brake to set and release the same; said lever being so located as to be moved by the inclined plane-engaging means, when moved along the wheel axis, to set the brake; and means automatically to return said inclined plane-engaging means and said lever to their initial positions so that the brake is released and the parts are ready for another application of the brake.

25. In combination with a wheel having braking means, a brake-operating mechanism comprising a normally non-magnetic stationary field; a source of electricity adapted to be connected to the field to magnetize the same; an operator-controlled switch adapted to connect the field with the source of electricity; an armature surrounded by the field and mechanically connected to the wheel to rotate therewith; mechanical means to cause said armature to travel longitudinally of the axis of the wheel under the influence of magnetic drag or retardation due to the lines of force cut by the armature when rotating in the magnetized field; and mechanical means for actuating the braking means adapted to be moved when the armature moves longitudinally as aforesaid, thereby translating the longitudinal travel of the armature into brake-setting movement.

26. In combination with a vehicle wheel having a brake, mechanical means for setting the brake and a spring for releasing the brake-setting means; a member secured to the wheel and having a helical inclined plane formed thereon, the axis of the helix being the axis of the wheel; magnetizable means engaging the helical inclined plane and adapted, when not magnetized, to rotate synchronously with said member and the wheel; and electrical means under the control of an operator to create in said magnetizable means, when magnetized and rotating, a counter E. M. F. which retards rotation thereof, thus causing travel thereof along said helical inclined plane; the means for setting the brake being engaged by the magnetizable means when the latter has traveled, and the spring acting to restore the magnetizable means to its initial position when the brake-setting means is released.

27. In combination with a wheel having a brake, brake setting means comprising a magnetizable member, means connecting the magnetizable member with the wheel so that said member may rotate synchronously with the wheel, operator controlled means to magnetize or demagnetize said member thereby to magnetically brake said member when rotating with the wheel; the means connecting the magnetizable member with the wheel affording a considerable mechanical advantage to the wheel and being so constructed and arranged as to move the magnetizable member along the axis of the wheel; and mechanism moved by said magnetizable member when moved along the wheel axis, said mechanism actuating the brake to set the same and being so constructed and arranged as to multiply the aforesaid mechanical advantage, whereby part of the momentum of the wheel is translated into brake-setting effort.

28. The invention according to claim 19, wherein a spring is provided and is so located as to be engaged by part of the brake operating means to store up potential energy from the brake operating means when the brake operating means sets the brake; said spring being of sufficient strength to restore the brake operating means to the normal or brake-freeing position when the magnetizable member is demagnetized; said brake operating means being engageable with the magnetizable member so that when the brake operating means is restored as aforesaid it moves the magnetizable member back to the latter's initial position, such movement taking place by expenditure of the potential energy of the spring; the parts being so constructed, proportioned and arranged that the entire braking system is reset automatically and immediately after the aforesaid demagnetization.

ROYAL A. VISSING.